United States Patent [19]

Samsel

[11] 4,418,306

[45] Nov. 29, 1983

[54] DIRECTIONAL DATA STABILIZATION SYSTEM

[75] Inventor: Richard W. Samsel, Pittsfield, Mass.

[73] Assignee: The United States of America as represented by the Secretary of the Navy, Washington, D.C.

[21] Appl. No.: 319,153

[22] Filed: Nov. 6, 1981

[51] Int. Cl.³ .............................................. B64C 17/02
[52] U.S. Cl. .................................... 318/648; 318/584; 318/656; 244/171
[58] Field of Search ............... 318/648, 649, 585, 584, 318/656; 244/171

[56] References Cited

U.S. PATENT DOCUMENTS

| | | | |
|---|---|---|---|
| 2,989,672 | 6/1961 | Agins | 318/649 |
| 3,398,341 | 8/1968 | Dooley et al. | 318/649 |
| 4,052,654 | 10/1977 | Kramer et al. | 318/649 |
| 4,223,259 | 9/1980 | Ernsberger et al. | 318/649 X |

*Primary Examiner*—B. Dobeck

[57] ABSTRACT

An azimuth data stabilization system for a shipborne mechanically scanned search-track system. A unitary package is provided mounted on the roll and pitch stabilized search-track system platform. The package includes a gyro stabilized turntable with the axis of rotation thereof aligned parallel to the axis of rotation of the search-track system. A gyro-torquer loop is provided to inertially stabilize the turntable and a synchro or resolver chain is provided to align the turntable with an azimuth reference. Corrected ships heading signals, derived from the angular position of the turntable, are either coupled directly to appropriate data processing equipment or are combined differentially as compensating signals with the azimuth data signals from the search-track system to provide a true azimuth data output.

24 Claims, 5 Drawing Figures

DIRECTIONAL DATA STABILIZATION SYSTEM

BACKGROUND OF THE INVENTION

The present invention relates to directional data stabilization for gimbal mounted instrumentalities and more particularly to azimuth data stabilization for a shipborne mechanically scanned search-track system mounted on a roll/pitch stabilized platform and coupled to a remotely located azimuth reference, such as the ship's gyro compass.

Search-track systems of the character described above stabilized only in roll and pitch have the virtue of relative simplicity but do not compensate for azimuth data errors resulting from misalignment of the platform pedestals with respect to the azimuth reference nor do they compensate for errors resulting from azimuth coupled roll and pitch motions or for errors occasioned by flexure of the portion of the ship's structure upon which the search-track system is mounted. Shipborne search-track systems are typically mounted high on the ship's superstructure where structural flexure occurs when the ship works in a seaway and are thus subject to small, but significant, azimuth errors occasioned by the structural flexure.

SUMMARY OF THE INVENTION

It is therefore an object of the present invention to stabilize directional data from a gimbal mounted instrumentality.

It is another, and more specific, object of the present invention to provide azimuth data stabilization for a shipborne search-track system mounted on a roll and pitch stabilized platform and coupled to a remote azimuth reference.

It is a more particular object of the present invention to provide an azimuth data stabilization system for a shipborne searchtrack system, mounted on a roll and pitch stabilized platform, which substantially eliminates azimuth errors resulting from misalignment of the platform pedestals with respect to the azimuth reference, azimuth coupled roll and pitch motions, and flexure of the sturcture upon which the platform is mounted.

Briefly, these and other objects of the present invention are accomplished by mounting a gyro stabilized turntable on the search-track system platform, aligning the turntable with respect to the azimuth reference, and providing inertial stabilization for the turntable utilizing the gyro. Corrected ships heading signals, derived from the angular position of the turntable, may be directly coupled to data processing equipment or may be combined differentially with the azimuth output of the search-track system.

A more complete appreciation of this invention and the many attendant advantages thereof will be readily appreciated as the same becomes better understood by reference to the following detailed description when considered in conjunction with the accompanying drawings in which like numbers indicate the same or similar components, wherein:

DESCRIPTION OF THE PREFERRED EMBODIMENT

Figure 1:
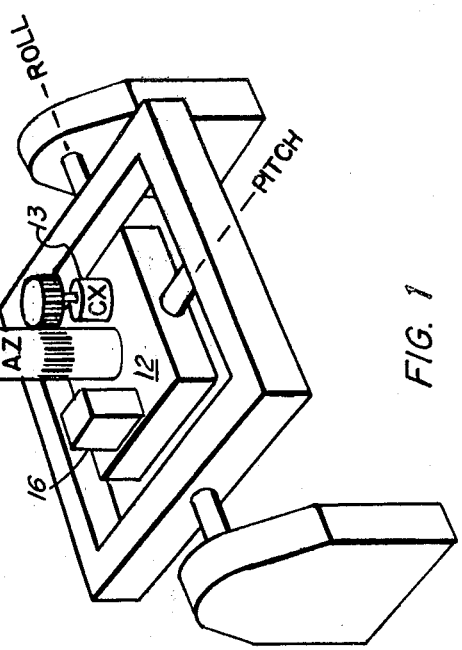
FIG. 1 illustrates embodiments of the invention mounted on a roll/pitch stabilized platform of a search-track system.

Referring now to FIG. 1, there is shown a mechanically scanned search-track system 11, or the scanner portion thereof, mounted on a roll and pitch stabilized platform 12. A synchro control transmitter 13, or resolver if desired, is mounted on platform 12 and geared or otherwise coupled to the rotating shaft of search track system 11 for conjoint rotation therewith, whereby the output signals from the control transmitter provide a direct measure of the azimuth orientation of the search-track system. (In the embodiment of the invention illustrated in FIG. 4, control transmitter 13 is replaced by a differential control transformer 31). The azimuth stabilization system of the present invention, to be described hereinafter, is contained within an enclosure 16 mounted on platform 12.

Figure 2:
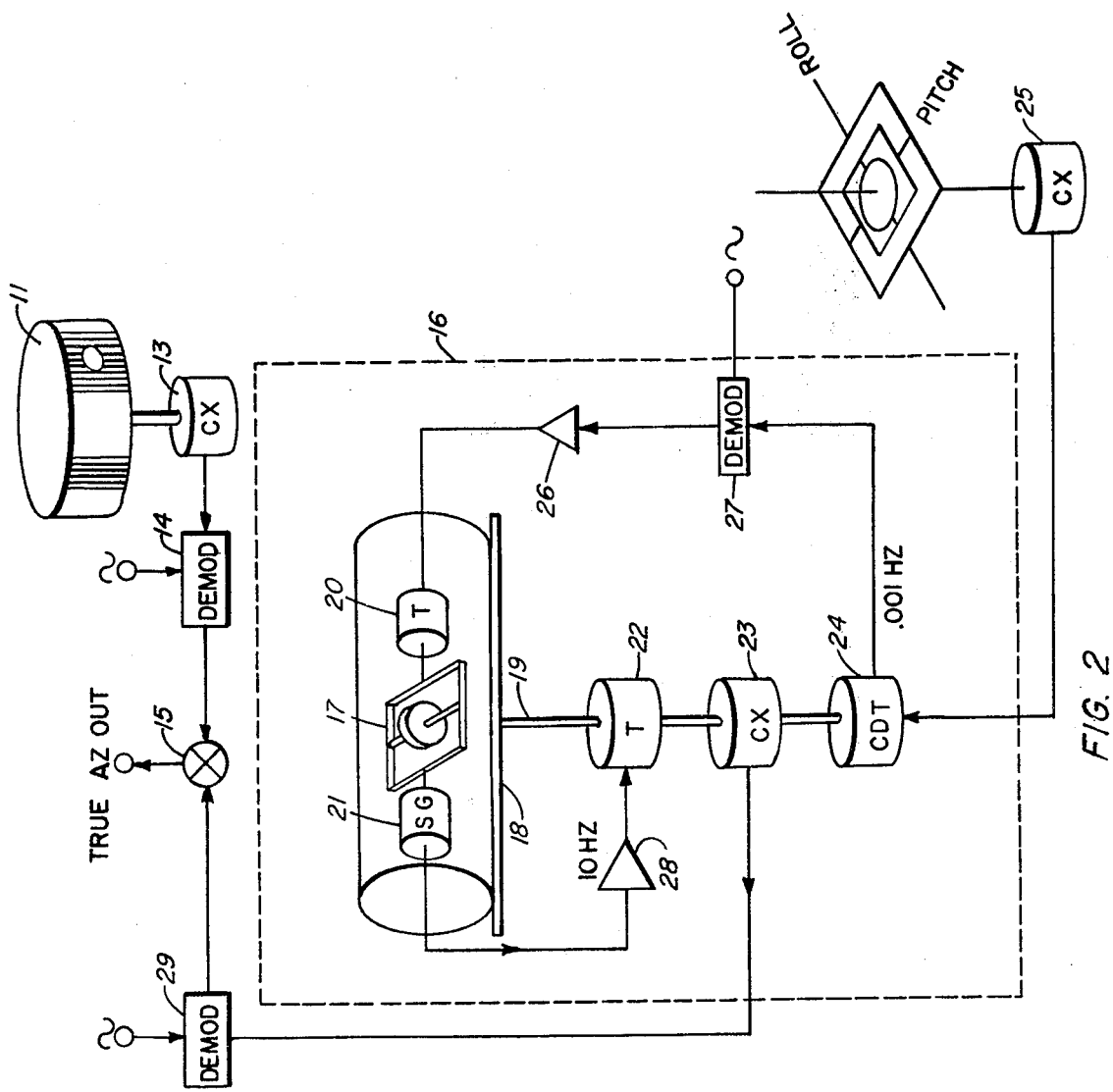
FIG. 2 illustrates an embodiment of the invention in which corrected ships heading and azimuth data signals are combined in a digital angle summer.

Referring now to FIG. 2, it may be seen that signals from control transmitter 13 are coupled through demodulators 14 to a digital angle summer 15, to be more fully described hereinafter. A voltage of the frequency employed to energize control transmitter 13 is applied to demodulators 14 whereby the outputs therefrom will be the modulation envelopes of the control transmitter output signals. If the search-track system were aligned with an azimuth reference, such as the ships gyro compass, and the ship gyro compass control transmitter 25 were coupled to summer 15, the output signal from summer 15 would represent true target azimuth. However, as pointed out above, oscillatory azimuth errors will be introduced by misalignment of the pedestals of platform 12, flexure of the structure upon which platform 12 is mounted, and azimuth coupled roll and pitch motions. The azimuth data from summer 15, in the absence of compensating signals, would therefor contain the aforementioned errors.

Continuing to refer to FIG. 2, an integrating gyro 17 is mounted on a turntable 18 with the output axis of the gyro perpendicular to shaft 19 of turntable 18 and the input axis thereof coaxial therewith.

Referring again to FIG. 1, container 16 is carefully mounted on platform 12 to insure that shaft 19 and the input axis of gyro 17 are aligned to be parallel with the axis of rotation of search-track system 11. The roll and pitch stabilization provided by platform 12 will thereafter maintain shaft 19 and the input axis of gyro 17 vertical.

Referring again to FIG. 2, a torquer 20 and a signal generator 21 are mounted on the output axis of gyro 17. Conventionally, gyro 17, torquer 20, and signal generator 21 would all be mounted within a single housing, as indicated.

A second torquer 22, a control transmitter 23, and a differential control transformer 24 are all coupled to shaft 19 for conjoint rotation with turntable 18. Resolvers are preferred to synchros for these units because resolvers often have better angular accuracy. Therefore, when the azimuth stabilization system of the present invention is coupled to existing synchros, if resolvers are used it will be necessary to employ Scott T transformers, or the like, for matching purposes.

Referring again to FIG. 1, container 16 is aligned in rotation about an axis parallel to the axis of rotation of search-track system 11 so that the stators of control transmitter 23, and differential control transformer 24, are aligned in azimuth with the stator of control transmitter 13 associated with the search-track system 11.

In order to align turntable 18 with the ship's azimuth reference, the ship's gyro compass in the illustrative embodiment, signals from the azimuth synchro 25 of the ship's gyro compass are coupled to differential control transformer 24. Error signals from the differential control transformer 24 are coupled through demodulators 27 and amplifiers 26 and are applied to torquer 20. This causes gyro 17 to rotate slightly producing an output signal from signal generator 21 which is coupled through an amplifier 28 to torquer 22. Turntable 18 is thereupon rotated by torquer 22 until the signals from differential control transformer 24 are nulled. At this point turntable 18 (along with gyro 17) is aligned with the ship's gyro compass assuming the synchros or resolvers are properly zeroed at installation. The bandwidth of the loop just described is made low to effect long term correction without causing rapid oscillations.

Signals from control transmitter 23 represent ships heading corrected for the misalignment of the pedestals of platform 12 with respect to the ship's gyro compass. These corrected ships heading signals may be either coupled to appropriate data processing equipment or may be coupled through demodulators 29 and applied as an azimuth compensating signal to angle summer 15. Angle summer 15 converts the demodulator outputs to a digital angle format and then digitally adds the two angles.

The azimuth stabilization data system of the present invention also includes a rapid acting inertial loop, comprising gyro 17, signal generator 21, amplifier 28, and torquer 22, to maintain turntable 18 and gyro 17 oriented with respect to inertial space. If turntable 18 is displaced from this orientation, gyro 17 will precess about the output axis thereof generating an error signal in signal generator 21. As before, the error signal is applied through amplifier 28 to torquer 22. Torquer 22 then applies a correcting torque to turntable 18. As pointed out above, small oscillatory deviations of turntable 18 from its inertial orientation may be caused by flexure of the ship's structure upon which platform 12 is mounted or by azimuth coupled roll and pitch motions acting through the low bandwidth loop from control transmitter 25 to torquer 20. The bandwidth of the gyro 17 to torquer 22 loop is made high to effectively suppress these oscillations and any deviations that might result from friction reversals in the bearings on which turntable 18 is supported.

Figure 3:
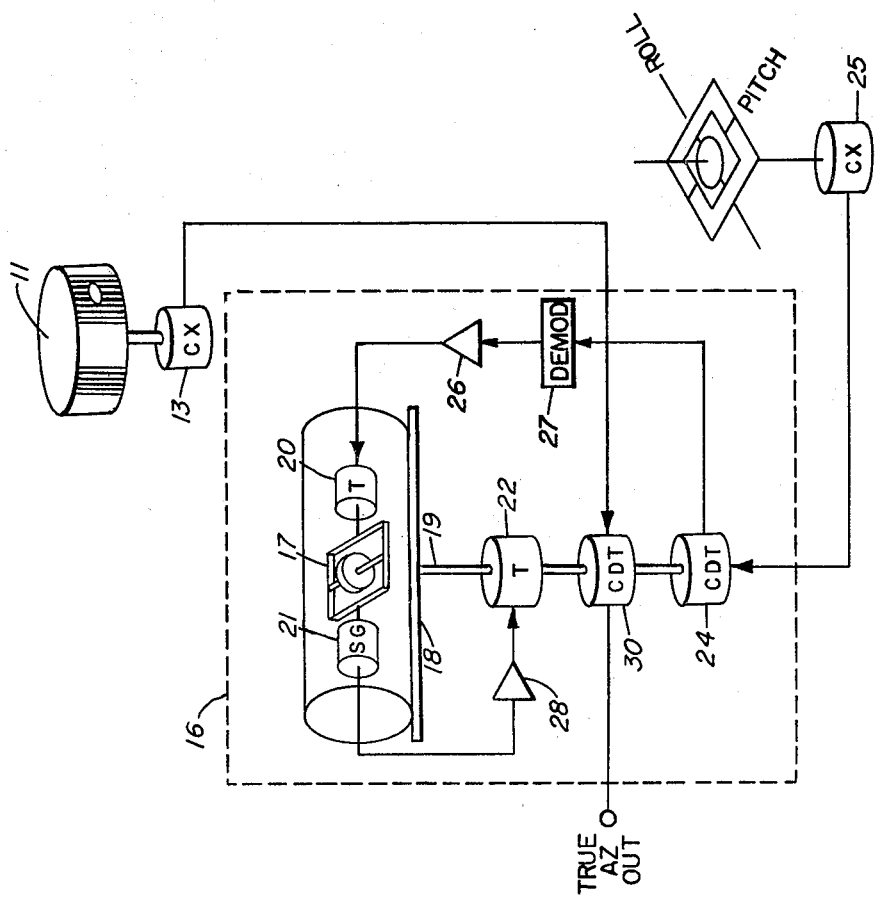
FIG. 3 illustrates an embodiment of the invention in which corrected ships heading and azimuth data signals are combined in a differential control transformer coupled to the turntable shaft.

FIG. 3 illustrates an embodiment of the invention wherein control transmitter 23, demodulators 14, 29, and angle summer 15 are replaced by a second differential control transformer 30 coupled to shaft 19. In this embodiment, the angle of turntable 18 and the angle read by control transmitter 13 are directly added by differential control transformer 30 to provide true azimuth output signals.

Figure 4:
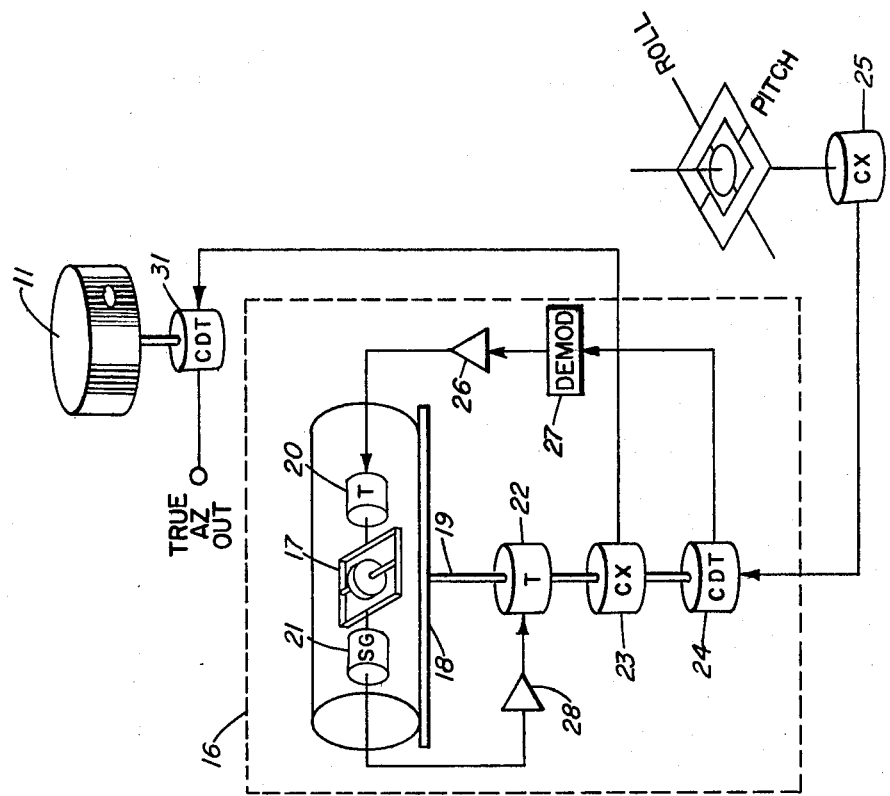
FIG. 4 illustrates an embodiment of the invention in which corrected ships heading and azimuth data signals are combined in a differential control transformer coupled to the search-track system.

Alternatively, as illustrated in FIG. 4, control transmitter 13 of search-track system 11 may be replaced by a differential control transformer 31. The angle of turntable 18 from control transmitter 23 is again directly added in the differential control transformer 31 to the search-track system angle to provide true azimuth output signals. In this embodiment, as well as in the embodiment of FIG. 3, demodulators 14, 29, and angle summer 15 are not needed.

Figure 5:
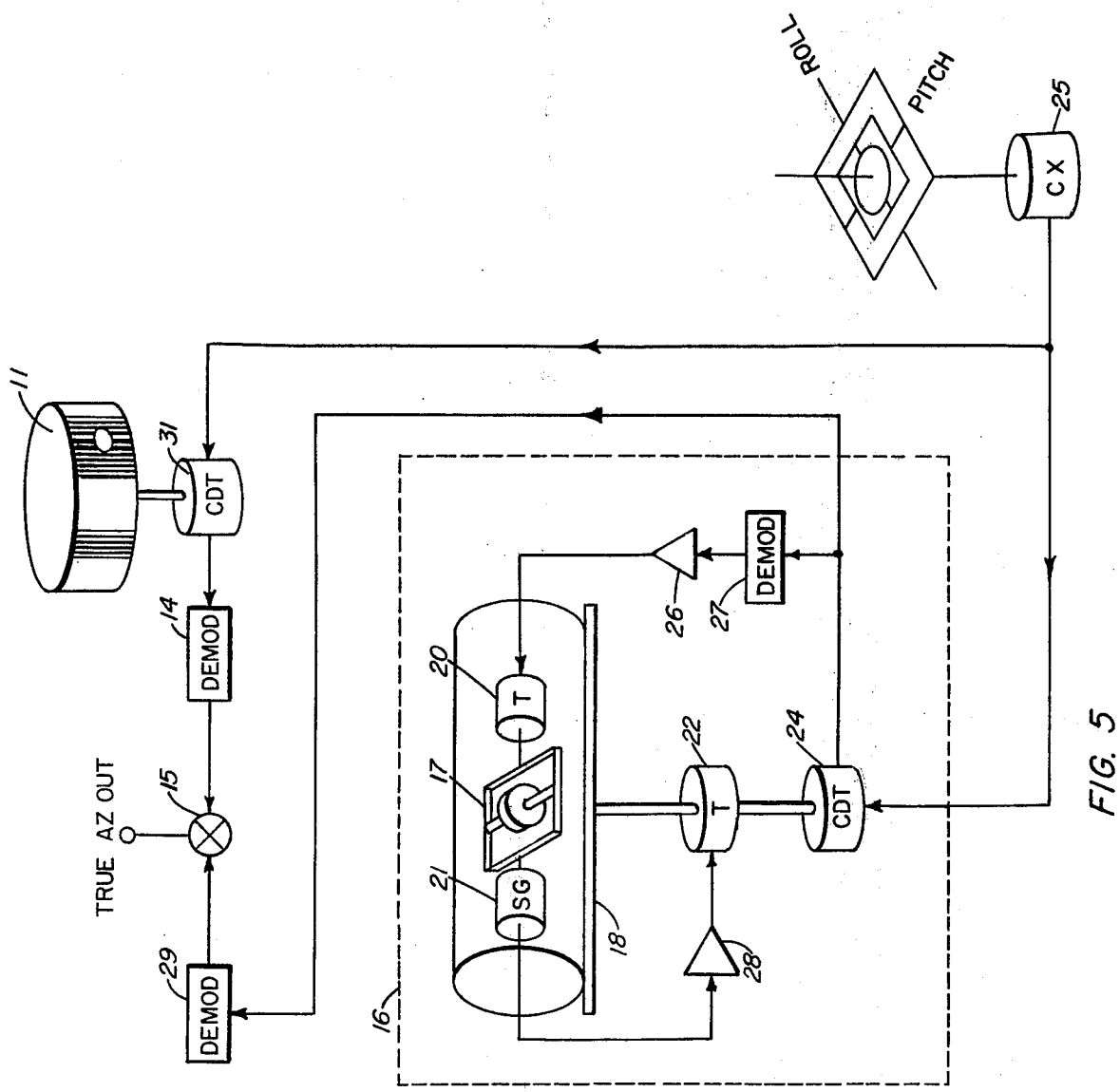
FIG. 5 illustrates an embodiment of the invention in which azimuth misalignment signals and azimuth data signals from differential control transformers are combined in a digital angle summer to provide true azimuth data signals.

FIG. 5 illustrates an embodiment wherein the misalignment signals from differential control transformer 24 can be demodulated by demodulator 29 and summed in summer 15 as in FIG. 1 if the ships heading signals from azimuth reference control transmitter 25 are coupled to demodulator 14 through differential control transformer 31 on the search-track system. In this embodiment neither differential control transformer 30 nor control transmitter 23 are required.

There has thus been disclosed an azimuth data stabilization system for a shipborne search-track mounted on a platform stabilized for roll and pitch only which takes into account azimuth errors resulting from misalignment of the search-track system platform pedestals with respect to the azimuth reference, azimuth coupled roll and pitch motions, and flexure of the structure upon which the search-track system platform is mounted.

Obviously numerous modifications and variations of the present invention are possible in light of the above teachings. For example, while embodiments of the invention have been described which correct azimuth data from a search-track system, it is obvious that the invention may be applied to correct angle data from any axis of any gimbal mounted instrumentality. It is therefore to be understood that within the scope of the appended claims the invention may be practiced otherwise than as specifically described herein.

What is claimed as new and desired to be secured by Letters Patent of the United States is:

1. A directional data stabilization system comprising:
   a gimbal mounted instrumentality,
   an inertial device aligned with an axis of said gimbal,
   means to maintain the inertial orientation of said device,
   means to provide an error signal proportional to the deviation of said device from inertial orientation,
   a directional reference,
   means to align said device with said directional reference,
   and means to provide a signal proportional to the angle of said instrumentality from said device when said device is aligned with said reference.

2. An azimuth data stabilization system comprising:
   a search-track system,
   an inertial device aligned in roll and pitch with said search-track system,
   means to maintain the inertial orientation of said device,
   means to provide an error signal proportional to the deviation of said device from inertial orientation,
   an azimuth reference,
   means to align said device with said azimuth reference, means to provide signals proportional to the angle of said device from said azimuth reference when said device is aligned with said reference, and means to provide output signals proportional to the azimuth orientation of said search-track system.

3. The azimuth data stabilization system of claim 2 wherein:

said search-track system is mechanically scanned, said inertial device is a gyro oriented with the input axis thereof parallel to the rotational axis of said search-track system, and said means to maintain the inertial orientation of said device comprises a signal generator coupled to the output axis of said gyro and a torquer coupled to the input axis thereof and to said signal generator.

4. The azimuth data stabilization system of claim 3, wherein:

said means to align said device with said azimuth reference comprises a differential control transformer coupled to the input axis of said gyro and to said azimuth reference and a torquer coupled to the output axis of said gyro and to said differential control transformer.

5. The azimuth data stabilization system of claim 4, wherein:

said means to provide corrected ships heading signals comprises a control transmitter coupled to the input axis of said gyro.

6. The azimuth data stabilization system of claim 2 wherin:

said search-track system is mechanically scanned, said inertial device is a turntable with the shaft thereof oriented parallel to the rotational axis of said search-track system and an integrating gyro mounted on said turntable with the input axis thereof co-axial with said shaft, and said means to maintain the inertial orientation of said device comprises a signal generator coupled to the output axis of said gyro and a torquer coupled to said shaft and to said signal generator.

7. The azimuth data stabilization system of claim 6, wherein:

said means to align said device with said azimuth reference comprises a differential control tr‚ans- former coupled to said shaft and to said azimuth reference and a torquer coupled to the output axis of said gyro and to said differential control transformer.

8. The azimuth data stabilization system of claim 7, wherein:

said means to provide corrected ships heading signals comprises a control transmitter coupled to said shaft.

9. An azimuth data stabilization system comprising:

a search-track system, an inertial device aligned in roll and pitch with said search-track system, means to maintain the inertial orientation of said device, means to provide an error signal proportional to the deviation of said device from inertial orientation, an azimuth reference, means to align said device with said azimuth reference, means to provide signals proportional to the misalignment of said device from said azimuth reference when said device is aligned with said reference, means to provide a signal proportional to the azimuth orientation of said search-track system, and means to differentially combine said search-track system signal and said signals.

10. The azimuth stabilization system of claim 9, wherein:

said search-track system is mechanically scanned, said inertial device is a gyro oriented with the input axis thereof parallel to the rotational axis of said search-track system, and said means to maintain the inertial orientation of said device comprises a signal generator coupled to the output axis of said gyro and a torquer coupled to the input axis thereof and to said signal generator.

11. The azimuth data stabilization system of claim 10, wherein:

said means to align said device with said azimuth reference comprises a differential control transformer coupled to the input axis of said gyro and to said azimuth reference and a torquer coupled to the output axis of said gyro and to said differential control transformer.

12. The azimuth data stabilization system of claim 1 wherein:

said means to provide a signal proportional to the azimuth orientation of said search-track system comprises a control transmitter coupled for conjoint rotation with said search-track system.

13. The azimuth data stabilization system of claim 12 wherein:

said means to provide corrected ships heading signals comprises a control transmitter coupled to the input axis of said gyro, and said means to differentially combine said search-track system signal and said corrected ships heading signals comprises a digital angle summer coupled to said control transmitters.

14. The azimuth data stabilization system of claim 12 wherein:

said means to provide corrected ships heading signals and said means to differentially combine said search-track system signal and said error signals comprises a differential control transformer coupled to the input axis of said gyro and to said control transmitter.

15. The azimuth data stabilization system of claim 11 wherein:

said means to provide corrected ships heading signals comprises a control transmitter coupled to the input axis of said gyro, and said means to provide a signal proportional to the azimuth orientation of said search-track system and to differentially combine said search-track system signal and said corrected ships heading signals comprises a differential control transformer coupled to said search-track system and to said control transmitter.

16. The azimuth data stabilization system of claim 9, wherein:

said search-track system is mechanically scanned, said inertial device is a turntable with the shaft thereof oriented parallel to the rotational axis of said search-track system and an integrating gyro mounted on said platform with the input axis thereof co-axial with said shaft, and said means to maintain the inertial orientation of said device comprises a signal generator coupled to the output axis of said gyro and a torquer coupled to said shaft and to said signal generator.

17. The azimuth data stabilization system of claim 16, wherein:
said means to align said device with said azimuth reference comprises a differential control transformer coupled to said shaft and to said azimuth reference and a torquer coupled to the output axis of said gyro and to said differential control transformer.

18. The azimuth data stabilization system of claim 17 wherein:
said means to provide a signal proportional to the azimuth orientation of said search-track system comprises a control transmitter coupled for conjoint rotation with said search-track system.

19. The azimuth data stabilization system of claim 18 wherein:
said means to provide corrected ships heading signals comprises a control transmitter coupled to said shaft, and
said means to differentially combine said search-track system signal and said corrected ships heading signals comprises a digital angle summer coupled to said control transmitters.

20. The azimuth data stabilization system of claim 18 wherein:
said means to provide corrected ships heading signals and said means to differentially combine said search-track system signal and said corrected ships heading signals comprises a differential control transformer coupled to said shaft and to said control transmitter.

21. An azimuth data stabilization system comprising:
a search-track system,
an inertial device aligned in roll and pitch with said search-track system,
means to maintain the inertial orientation of said device,
means to provide an error signal proportional to the deviation of said device from inertial orientation,
an azimuth reference,
means to provide a misalignment signal proportional to the angle between the said device and the azimuth reference,
means to align said device with said azimuth reference,
means to provide a signal proportional to the azimuth orientation of said search-track system, and
means to combine said search-track azimuth signal with said misalignment signal.

22. The azimuth stabilization system of claim 22, wherein:
said search-track system is mechanically scanned,
said inertial device is a gyro oriented with the input axis thereof parallel to the rotational axis of said search-track system, and
said means to maintain the inertial orientation of said device comprises a signal generator coupled to the output axis of said gyro and a torquer coupled to the input axis thereof and to said signal generator.

23. The azimuth data stabilization system of claim 22 wherein:
said means to provide a misalignment signal comprises a differential control transformer coupled to the input axis of said gyro and to said azimuth reference, and
said means to align said device with said azimuth reference comprises a torquer coupled to the output of said gyro and to said differential control transformer.

24. The azimuth data stabilization system of claim 23 wherein:
said means to provide a signal proportional to the azimuth orientation of said search-track system comprises a differential control transformer coupled to the search-track system and to the azimuth reference, and
said means to combine said search-track azimuth signal with said misalignment signal comprises a digital angle summer coupled to said differential control transformers.

* * * * *